US009332038B2

(12) United States Patent
Metzler et al.

(10) Patent No.: US 9,332,038 B2
(45) Date of Patent: *May 3, 2016

(54) REMOTE PROCEDURE CALL WITH CALL-BY-REFERENCE SEMANTICS USING REMOTE DIRECT MEMORY ACCESS

(71) Applicant: International Business Machines Corporation, Armonk, NY (US)

(72) Inventors: Bernard Metzler, Rueschlikon (CH); Patrick Stuedi, Rueschlikon (CH); Animesh K. Trivedi, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

This patent is subject to a terminal disclaimer.

(21) Appl. No.: 14/022,464

(22) Filed: Sep. 10, 2013

(65) Prior Publication Data

US 2014/0359146 A1  Dec. 4, 2014

Related U.S. Application Data

(63) Continuation of application No. 13/907,360, filed on May 31, 2013.

(51) Int. Cl.
*G06F 15/16* (2006.01)
*H04L 29/06* (2006.01)
*G06F 9/54* (2006.01)

(52) U.S. Cl.
CPC ............ *H04L 65/1069* (2013.01); *G06F 9/547* (2013.01)

(58) Field of Classification Search
USPC .................... 709/228, 220; 370/239; 719/313
See application file for complete search history.

(56) References Cited

U.S. PATENT DOCUMENTS

| 7,346,702 | B2 * | 3/2008 | Haviv | H04L 45/00 709/212 |
| 7,610,348 | B2 * | 10/2009 | Kisley | G06F 3/061 709/212 |
| 7,624,398 | B2 | 11/2009 | Wang et al. | |
| 7,716,323 | B2 * | 5/2010 | Gole | H04L 29/06 370/214 |
| 7,917,597 | B1 | 3/2011 | Lentini | |
| 8,856,352 | B2 * | 10/2014 | Revanuru | G06F 17/30286 709/200 |
| 8,954,785 | B2 * | 2/2015 | Fox | G06F 15/167 370/225 |

FOREIGN PATENT DOCUMENTS

CN        102546612 A        7/2012

OTHER PUBLICATIONS

Abstract of Chen et al., "A Fast RPC System for Virtual Machines", IEEE Transactions on Parallel and Distributed Systems, vol. 24 No. 7, Jul. 2013. 1 page.
Mitchell, "Distributed Systems", Data Communications: RPC & Group Communications, 1999. pp. 1-23.

* cited by examiner

*Primary Examiner* — Tammy Nguyen
(74) *Attorney, Agent, or Firm* — Cantor Colburn LLP; Daniel Morris

(57) ABSTRACT

Embodiments relate to providing remote procedure calls (RPC) with call-by-reference semantics using remote direct memory access (RDMA). An aspect includes establishing a session between a client and a server. A client session heap memory and a server session heap memory are initialized with a RDMA provider. A parameter is then stored in the session heap memory. A handle for the parameter is passed to the server which permits access to the parameter responsive to an on-demand request from the server.

4 Claims, 14 Drawing Sheets

REMOTE PROCEDURE CALL WITH CALL-BY-REFERENCE SEMANTICS USING REMOTE DIRECT MEMORY ACCESS

CROSS-REFERENCE TO RELATED APPLICATION

This application is a continuation of U.S. patent application Ser. No. 13/907,360, filed May 31, 2013, the disclosure of which is incorporated by reference herein in its entirety.

BACKGROUND

The present invention relates generally to remote procedure calls, and more specifically, to providing remote procedure calls with call-by-reference semantics using remote direct memory access.

A remote procedure call (RPC) is an inter-process communication that allows a computer program to cause a subroutine or procedure to execute in another address space, such as on another computer on a shared network, without the programmer explicitly coding the details for this remote interaction. That is, the programmer writes essentially the same code whether the subroutine is local to the executing program or remote. During the early development of RPC, network bandwidth was scarce, network latency was high, and central processing unit (CPU) clock speed was increasing under Moore's law. Accordingly, RPC function calls were typically defined over functions with simple signatures, which accepted mostly base types as arguments, to avoid large data transfers. This ensured that network transfer time was small compared to function execution time. These functions, however, still required a significant amount of computation.

BRIEF SUMMARY

According to an embodiment of the present invention, a method for providing remote procedure calls (RPC) with call-by-reference semantics using remote direct memory access (RDMA) is provided. The method includes establishing a session between a client and a server. A client session heap memory and a server session heap memory are initialized with a RDMA provider. A parameter is then stored in the session heap memory. A handle for the parameter is passed to the server which permits access to the parameter responsive to an on-demand request from the server.

According to another embodiment of the present invention, a system for providing RPC with call-by-reference semantics using RDMA is provided. The system includes a computer processor and logic executable by the computer processor. The logic is configured to implement a method. The method includes establishing a session between a client and a server. A client session heap memory and a server session heap memory are initialized with a RDMA provider. A parameter is then stored in the session heap memory. A handle for the parameter is passed to the server which permits access to the parameter responsive to an on-demand request from the server.

According to a further embodiment of the present invention, a computer program product for providing RPC with call-by-reference semantics using RDMA is provided. The computer program product includes a storage medium having computer-readable program code embodied thereon, which when executed by a computer processor, causes the computer processor to implement a method. The method includes establishing a session between a client and a server. A client session heap memory and a server session heap memory are initialized with a RDMA provider. A parameter is then stored in the session heap memory. A handle for the parameter is passed to the server which permits access to the parameter responsive to an on-demand request from the server.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein are directed to providing remote procedure calls (RPC) with call-by-reference semantics using remote direct memory access (RDMA). An aspect of embodiments includes establishing a session between a client and a server. A client session heap memory and a server session heap memory are initialized with a RDMA provider. A parameter is then stored in the session heap memory. A handle for the parameter is passed to the server which permits access to the parameter responsive to an on-demand request from the server.

Figure 1:
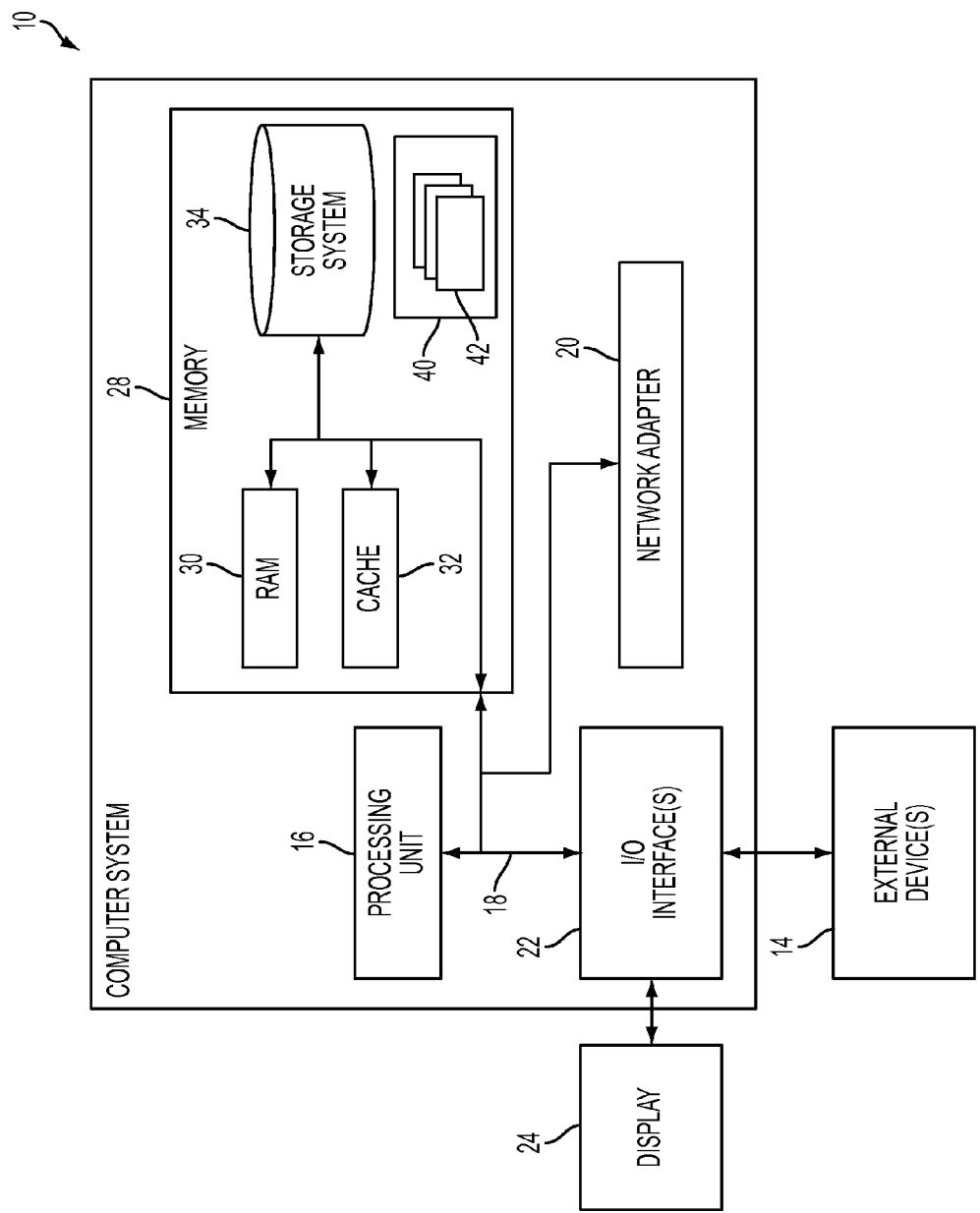
FIG. 1 depicts a block diagram of a computer system according to an embodiment.

Referring now to FIG. 1, a block diagram of a computer system 10 suitable for RPC with call-by-reference semantics using RDMA according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
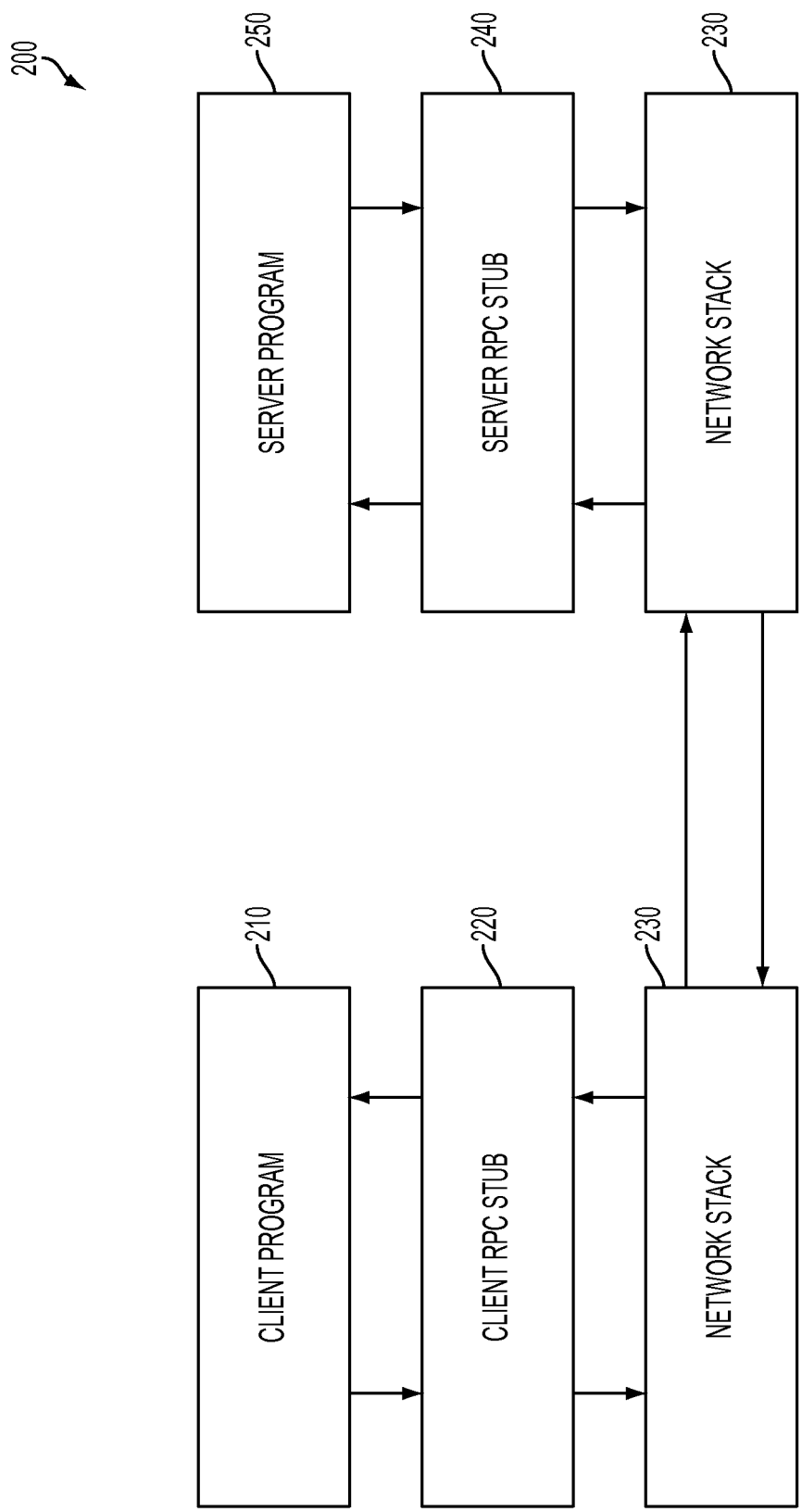
FIG. 2 depicts a block diagram of a remote procedure call (RPC) operation according to the conventional art.

FIG. 2 depicts a block diagram of a RPC operation 200 according to the conventional art. The RPC operation 200 may include a client program 210, a client RPC stub 220, a network stack 230, a server RPC Stub 240, and a server program 250.

Conventional remote function calls are typically defined as call-by-value, which means that the parameters are marshaled and transferred together with the RPC request. With reference to FIG. 2, the client program 210 calls the client RPC stub 220. The client RPC stub 220 marshals the parameters (i.e., packs the parameters into a message) received from the client program 210 and sends the message from the client (i.e., caller) machine to the server (i.e., callee) machine via a network stack 230. The server RPC stack 240 unmarshals the received parameters (i.e., unpacks the parameters from the message) and calls the server program 250. The reply from the server program 250 to the client program 210 traces the same path in the reverse direction. Accordingly, the RPC call sequence 200 marshals parameters on the client (i.e., caller) side and transfers the parameters with a RPC request to the server (i.e., callee) side. The RPC is then executed on the server (i.e., callee) side and the results are marshaled and transferred back to the client program 210.

Figure 3:
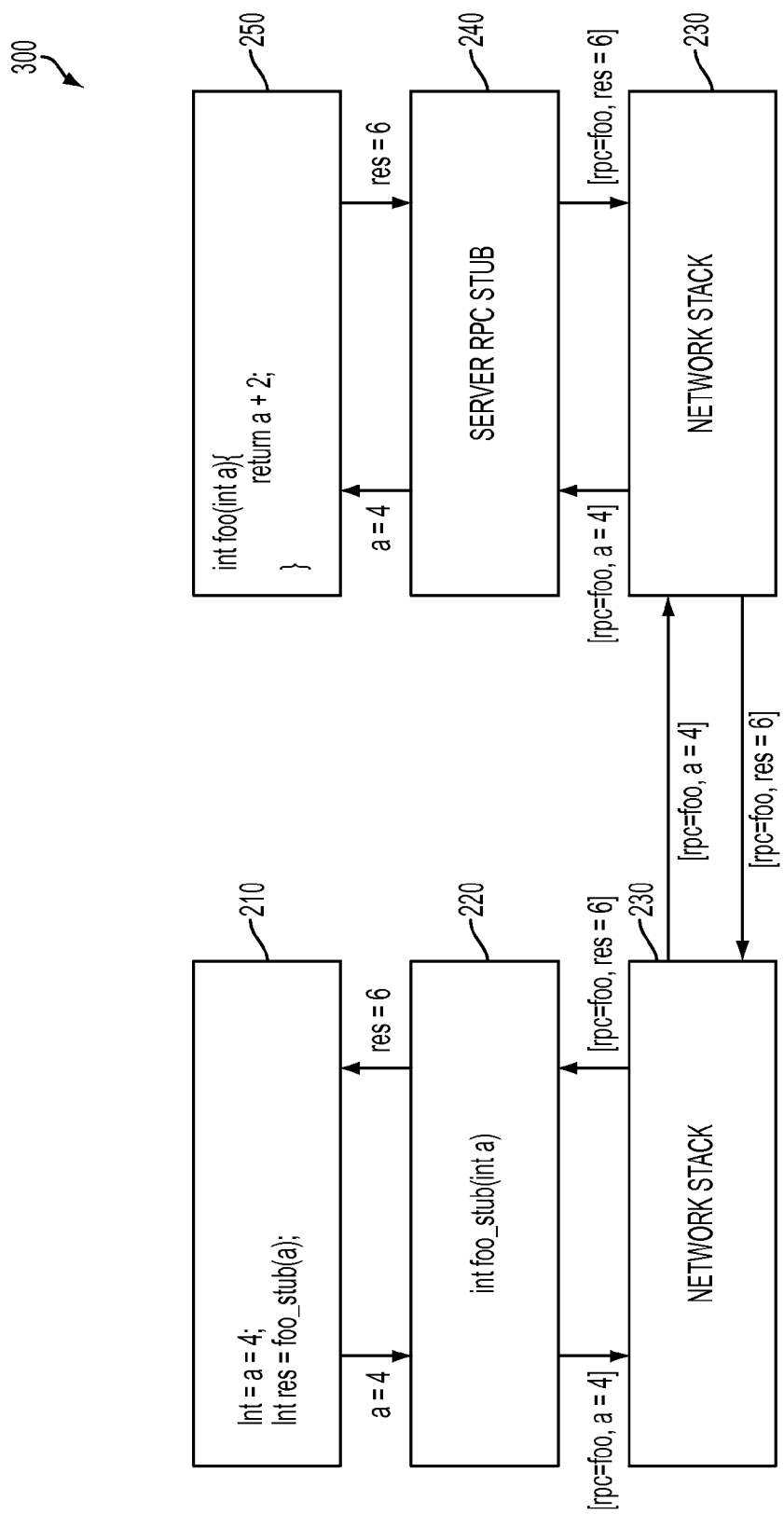
FIG. 3 depicts an example of a RPC operation where input and output parameters are transferred in-place with a RPC request according to the conventional art.

FIG. 3 depicts an example of a RPC operation 300 where input and output parameters are transferred in-place (i.e., call-by-value) with a RPC request according to the conventional art. As shown in FIG. 3, the client program 210 transfers a parameter value 'a' (a=4) in-place with an RPC request to function 'foo' (rpc=foo) of the server program 250 via the client RPC stub 220, network stack 230, and server RPC stub

240. The server program 250 executes the function 'foo' with the received parameter value 'a' and transfers the RPC result to the client program 210. In this example, the resulting parameter value (res=6) is transferred from the server program 250 to the client program 210.

Contemporary RDMA-based networks offer high performance throughput and latency together with one-sided read/write semantics. Due to contemporary RDMA networks, network latencies, and plateaued CPU clock speeds, it has been comparably cheap to access remote memory. Accordingly, embodiments disclosed herein leverage the cheap remote memory access to implement on-demand parameter fetching in RPC.

According to an embodiment, an RPC operation may be defined as call-by-reference, where parameters are not passed in-place but instead a handle is passed which allows a server program to fetch parts of the parameter on-demand. An embodiment is based on RDMA such that RPC parameter handles can be used in concert with RDMA read operations to fetch the actual value of the parameter. RDMA read executes with ultra-low latency and without interrupting or scheduling the caller according to an embodiment.

Figure 4:
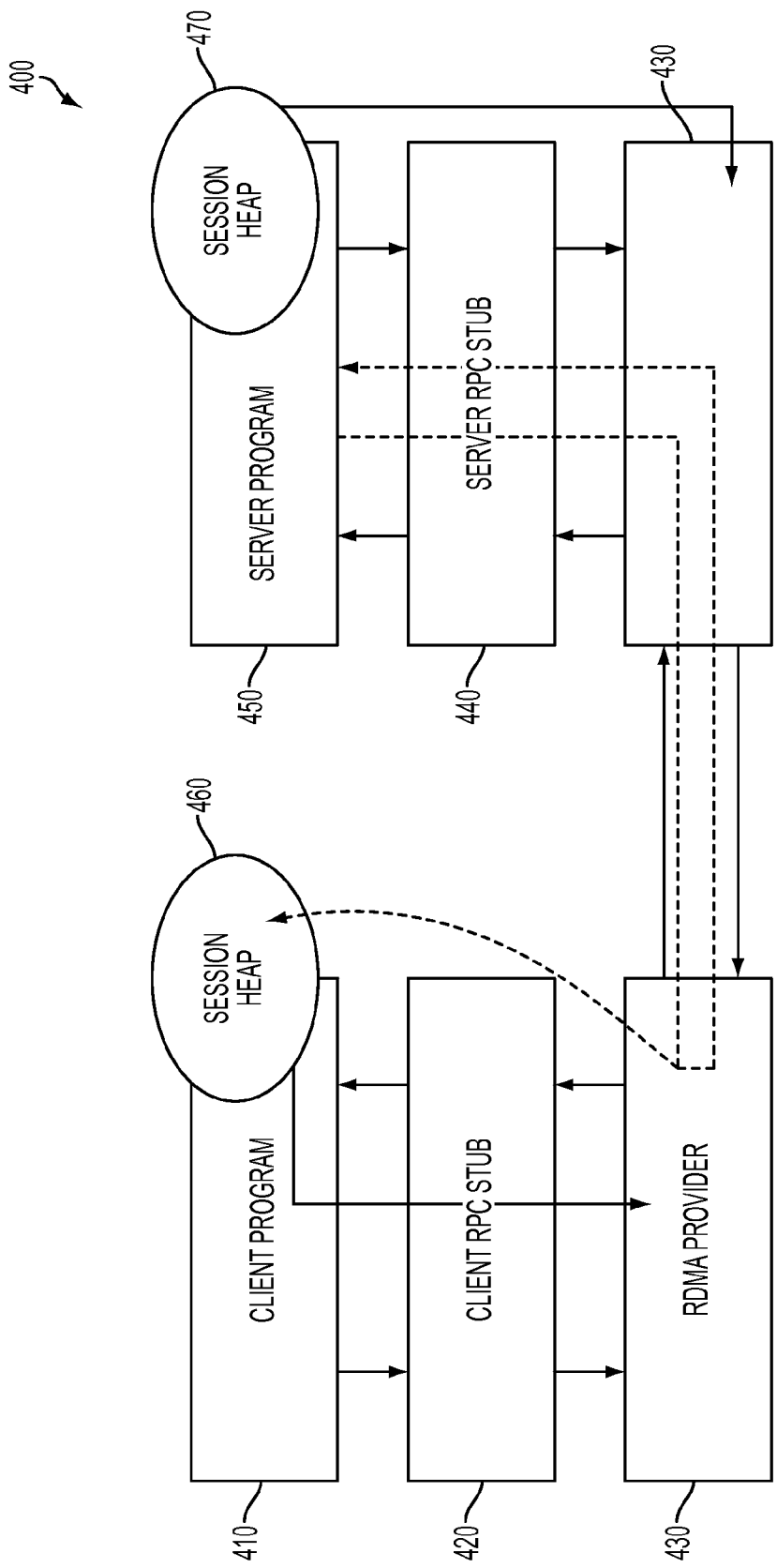
FIG. 4 depicts a block diagram of a RPC operation that passes of an input parameter by reference according to an embodiment.

With reference to FIG. 4, a block diagram of a RPC operation 400 that passes of an input parameter by reference according to an embodiment is shown. The RPC operation 400 may be performed by an embodiment of the processing device 16 of computer system 10, as discussed above. The RPC operation 400 of an embodiment may include a client program 410, a client RPC stub 420, a RDMA provider 430, a server RPC Stub 440, a server program 450, a client session heap 460, and a server session heap 470.

According to an embodiment, a client (i.e., caller) and a server may establish a session prior to the RPC operation 400. The establishment of a session may include the initialization of a client session heap 460 and a server session heap 470 on which a RPC function may operate. The client session heap 460 and the server session heap 470 may be initially populated with an empty memory parameter memory layout. The client session heap 460 and the server session heap 470 may be registered with the RDMA provider 430 during the establishment of the session.

Referring to FIG. 4, the client program 410 stores an input parameter in the client session heap 460 according to an embodiment. The client program 410 calls the client RPC stub 420 to pass the input parameter (e.g., object) by reference to the server program 450 via the RDMA provider 430 and the server RPC Stub 440. According to an embodiment, the passing of the input parameter includes a reference to the RPC function in the server program 450 and a handle for the input parameter. According to an embodiment, a RPC stub generator may distinguish between call by value and call by reference and produce stubs accordingly.

According to an embodiment, the server program 450 receives the handle for the input parameter and fetches the input parameter on-demand from the client session heap 460 to perform the RPC function. The server program 450 may access the client session heap 460 through a one-sided RDMA read without interrupting the client (i.e., caller). The RPC is then executed on the server side (i.e., callee side) and the results are transferred back to the client program 410, via the server RPC stub 440, the RDMA provider 430, and the Client RPC Stub 420.

Figure 5:
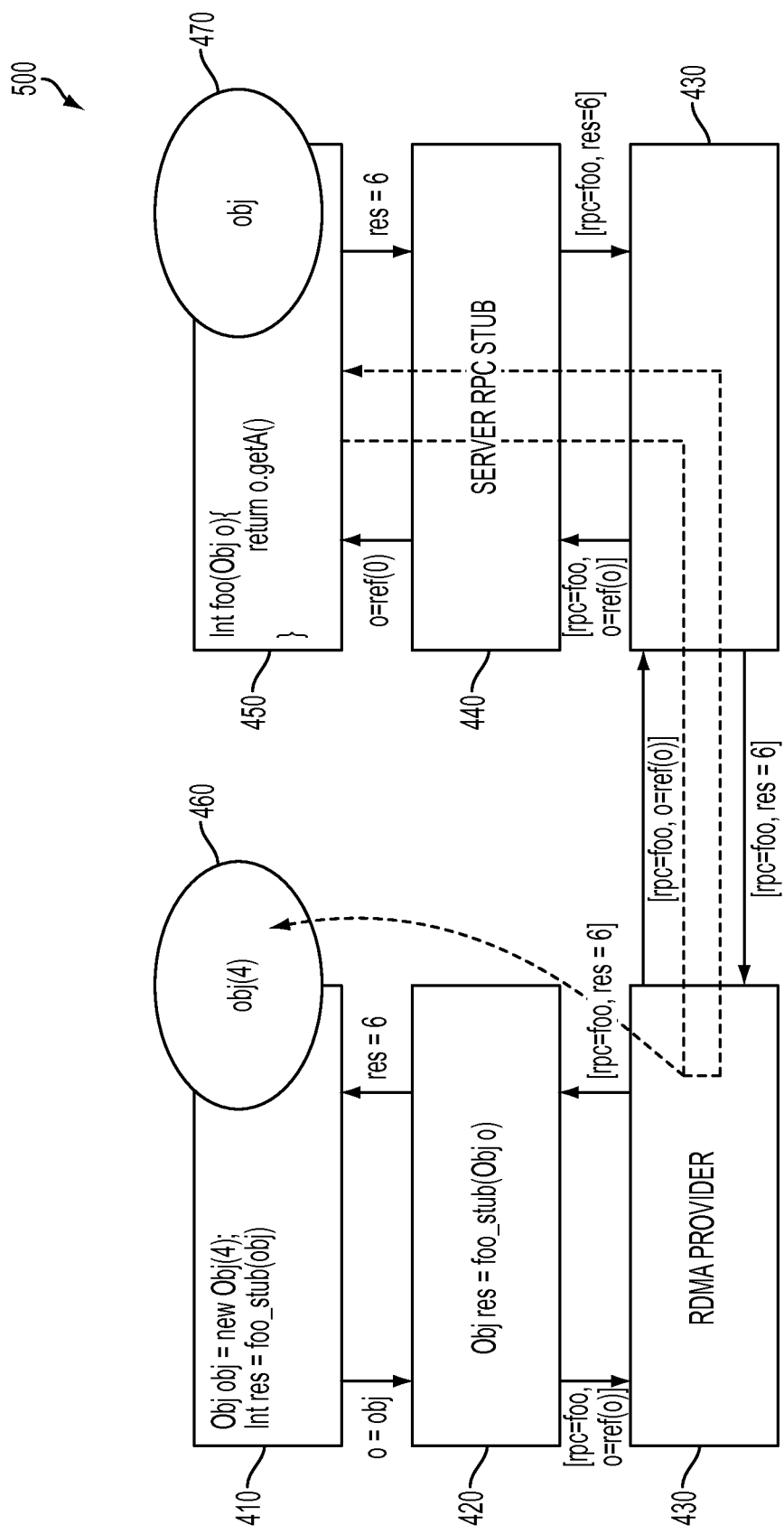
FIG. 5 depicts an example of a RPC operation that passes of an input parameter by reference according to an embodiment.

FIG. 5 depicts an example 500 of a RPC operation that passes of an input parameter by reference according to an embodiment. As shown in FIG. 5, the client program 410 creates and stores an input parameter to be passed by reference (e.g., obj(4)) in the client session heap 460 according to an embodiment. The client program 410 then transfers the input parameter 'o' by reference with an RPC request to function 'foo' (rpc=foo) in the server program 450, via the RDMA provider 430 and the server RPC Stub 440. According to an embodiment, the input parameter 'o' is passed using a handle (e.g., o=ref(o)).

According to an exemplary embodiment, the server program 450 receives the handle for the input parameter and fetches the input parameter on-demand from the client session heap 460 to perform the 'foo' function. That is, field 'a' of object 'o' is fetched on-demand when being accessed using o.getA( ). The fetching of field 'a' of object 'o' is accomplished via RDMA read. The RPC is then executed on the server side and the result (e.g., res=6) is transferred back to the client program 410, via the server RPC stub 440, the RDMA provider 430, and the client RPC Stub 420.

Figure 6:
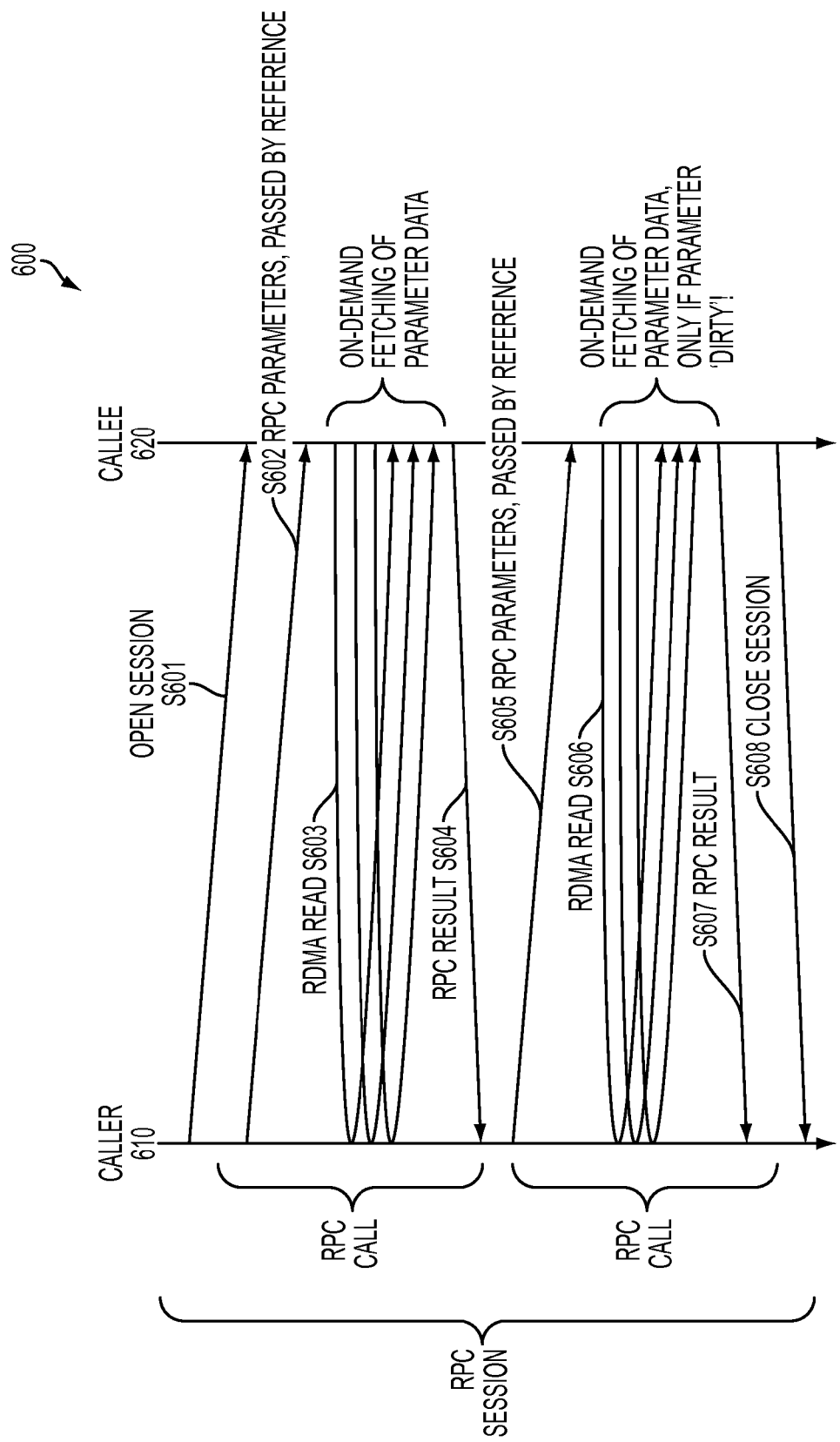
FIG. 6 depicts a message flow for a RPC with input parameter by reference according to an embodiment.

FIG. 6 depicts a message flow 600 for a RPC with input parameter by reference according to an embodiment. As shown in FIG. 6, a caller 610 opens a RPC session with a callee 620, as shown in S601. The caller 610 initializes an RPC call by passing RPC parameters by reference, as shown in S602. The callee 620 fetches the input parameter data on-demand via a RDMA read, as shown in S603. Once the callee 620 has fetched the input parameter data on-demand, the callee 620 execute the RPC function and return the RPC result to the caller 610, as shown in S604.

According to an embodiment, the callee 620 may cache a parameter state within the scope of a RPC session. Therefore, on repeating RPC calls within the same RPC session, only modified or updated parameters would have to be fetched by the callee 620. Accordingly, on a repeating RPC call, the caller 610 passes RPC parameters by reference, as shown in S605. The callee 620 now only fetches on-demand the input parameter data that has been updated or modified, as shown in S606. Once the callee 620 has fetched the modified or updated input parameter data on-demand, the callee 620 execute the RPC function and return the RPC result to the caller 610, as shown in S607. The callee 620 may then close the RPC session, as shown in S608.

Figure 7:
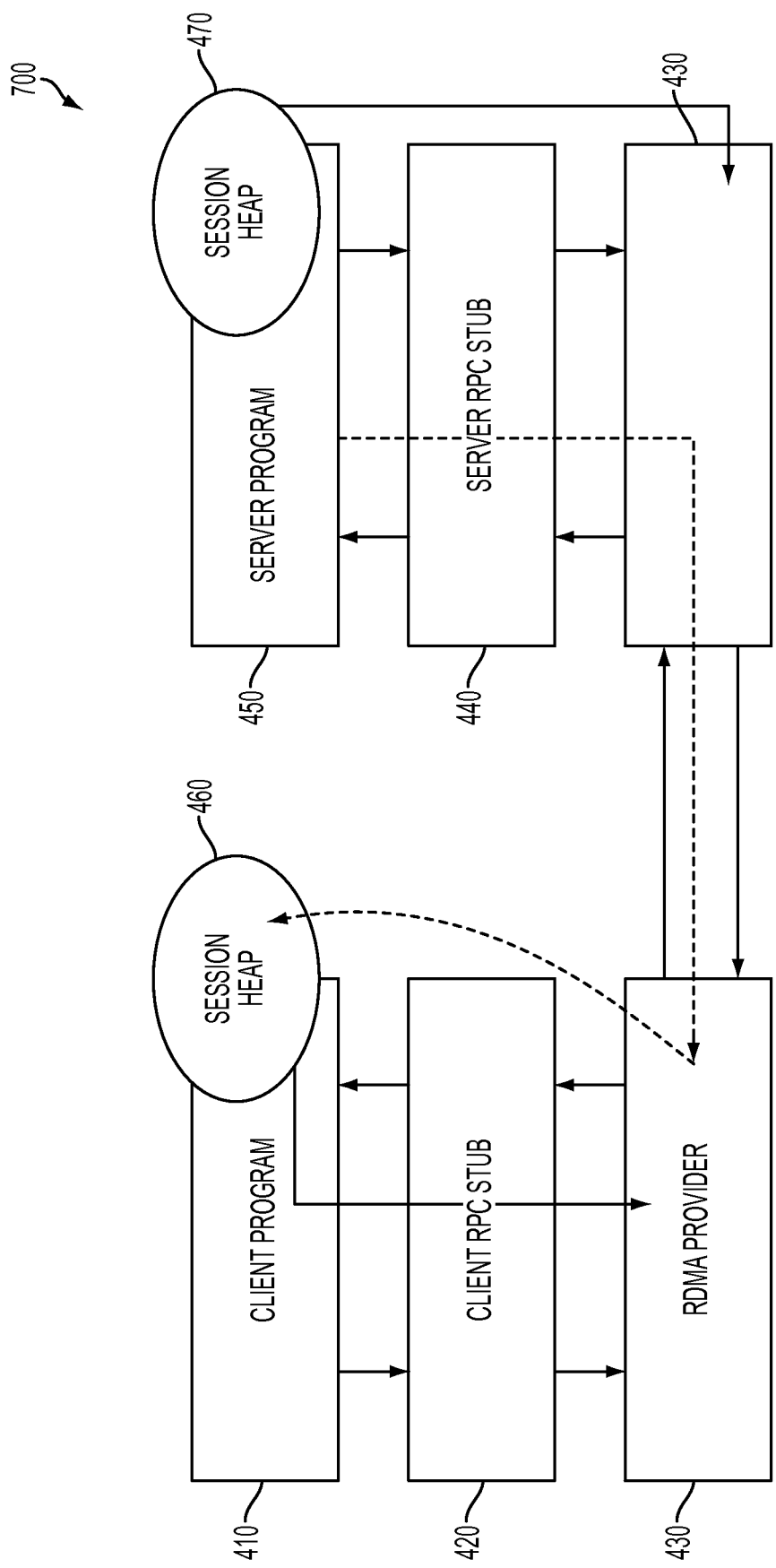
FIG. 7 depicts a block diagram of a RPC operation that passes an output parameter by reference according to an embodiment.

With reference to FIG. 7, a block diagram of a RPC operation 700 that passes an output parameter by reference according to an embodiment is shown. The RPC operation 700 may be performed by an embodiment of the processing device 16 of computer system 10, as discussed above. The RPC operation 700 of an embodiment may include a client program 410, a client RPC stub 420, a RDMA provider 430, a server RPC Stub 440, a server program 450, a client session heap 460, and a server session heap 470.

The client program 410 stores an output parameter in the client session heap 460 according to an embodiment. The client program 410 calls the client RPC stub 420 to pass the output parameter (e.g., object) by reference to the server program 450 via the RDMA provider 430 and the server RPC Stub 440. According to an embodiment, the passing of the output parameter includes a reference to the RPC function in the server program 450 and a handle for the output parameter.

According to an embodiment, the server program 450 receives the handle for the output parameter and executes the RPC function by modifying parameter fields in the client session heap 460 on-demand. The server program 450 may access the client session heap 460 through a one-sided RDMA write without interrupting the client. The server program then transmits the RPC result back to the client program 410, via the server RPC stub 440, the RDMA provider 430, and the client RPC Stub 420.

Figure 8:
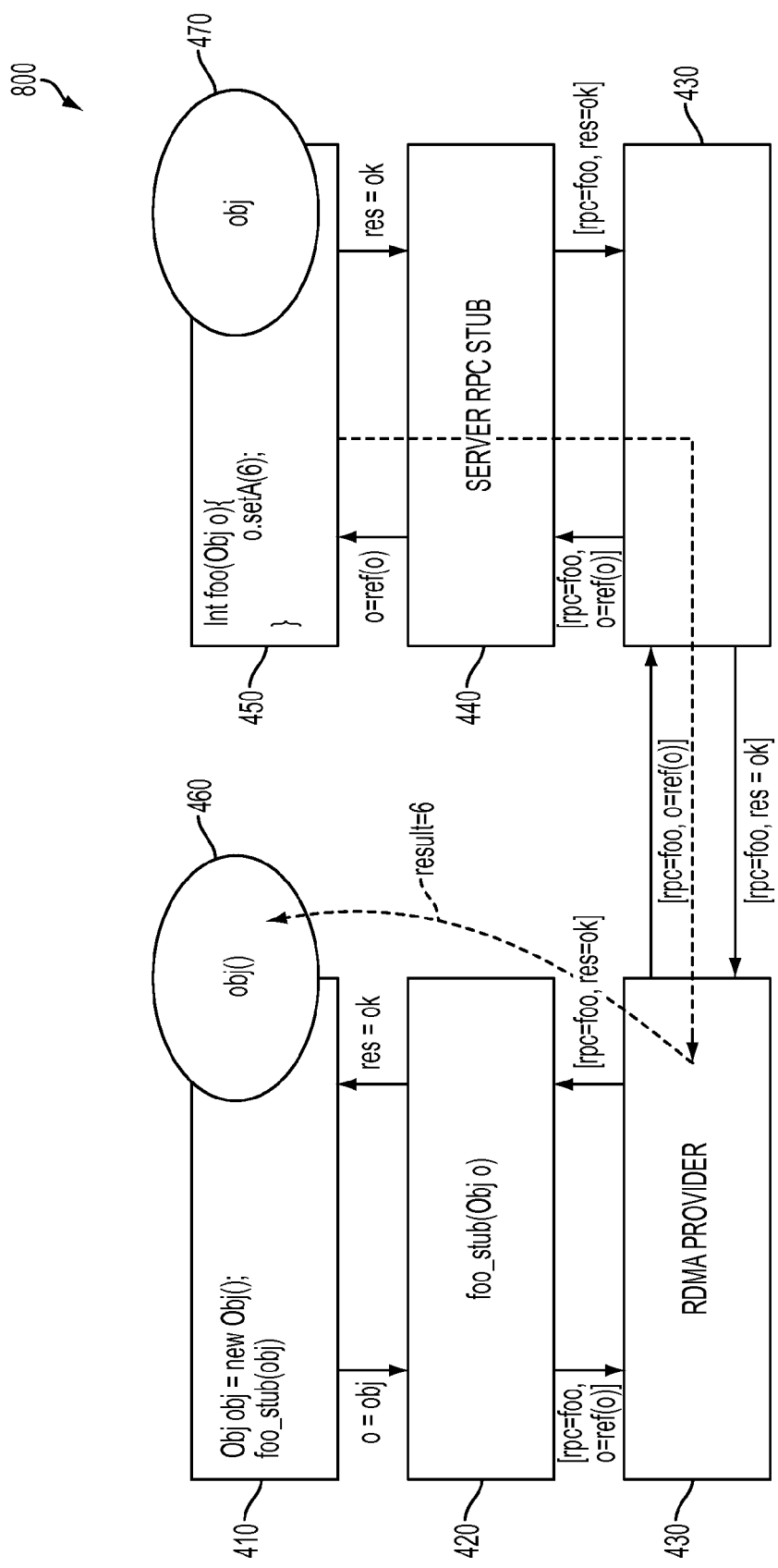
FIG. 8 depicts an example of a RPC operation that passes of an output parameter by reference according to an embodiment.

FIG. 8 depicts an example 800 of a RPC operation that passes of an output parameter by reference according to an embodiment. As shown in FIG. 8, the client program 410 creates and stores an output parameter to be passed by reference (e.g., obj( )) in the client session heap 460 according to an embodiment. The client program 410 then transfers the output parameter 'o' by reference with an RPC request to function 'foo' (rpc=foo) in the server program 450, via the RDMA provider 430 and the server RPC Stub 440. According to an embodiment, the output parameter 'o' is passed using a handle (e.g., o=ref(o)).

According to an exemplary embodiment, the server program 450 receives the handle for the output parameter and modifies the output parameter on-demand in the client session heap 460 to perform the 'foo' function. That is, the result field of object 'o' is written on-demand when being accessed by the server program 450 using o.setA( ). The writing of field 'a' of object 'o' is accomplished via RDMA write. The RPC result (e.g., res=ok) is transferred back to the client program 410, via the server RPC stub 440, the RDMA provider 430, and the client RPC Stub 420.

Figure 9:
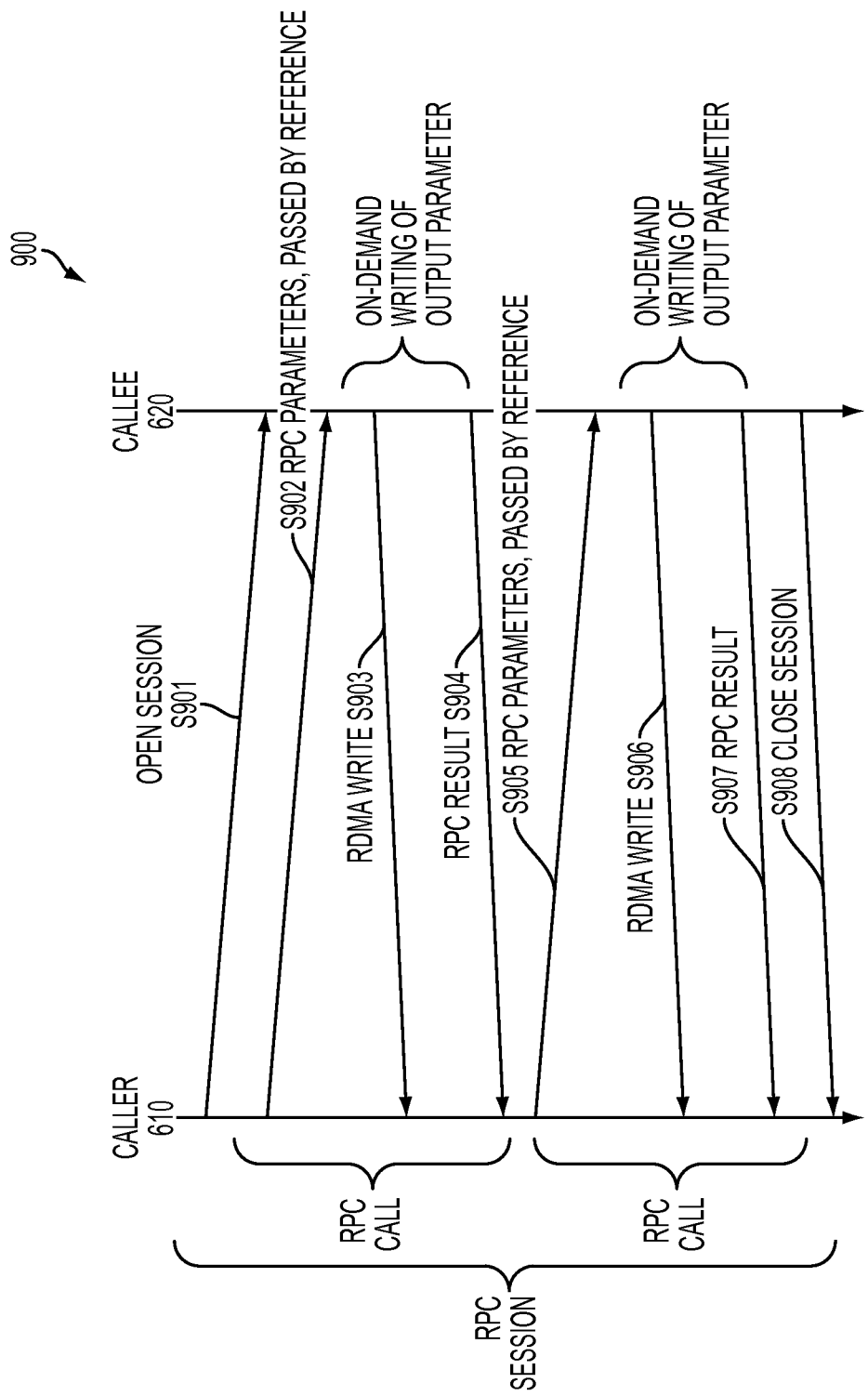
FIG. 9 depicts a message flow for a RPC with output parameter by reference according to an embodiment.

FIG. 9 depicts a message flow 900 for a RPC with output parameter by reference according to an embodiment. As shown in FIG. 9, a caller 610 opens a RPC session with a callee 620, as shown in S901. The caller 610 initializes an RPC call by passing RPC parameters by reference, as shown in S902. The callee 620 modifies the output parameter on demand via a RDMA write according to the RPC function, as shown in S903. Once the callee 620 has modified the output parameter data on-demand, the callee 620 returns the RPC result to the caller 610, as shown in S904. The RPC session may continue with a subsequent RPC call (S905-S907) until the callee 620 closes the RPC session, as shown in S908.

Figure 10:
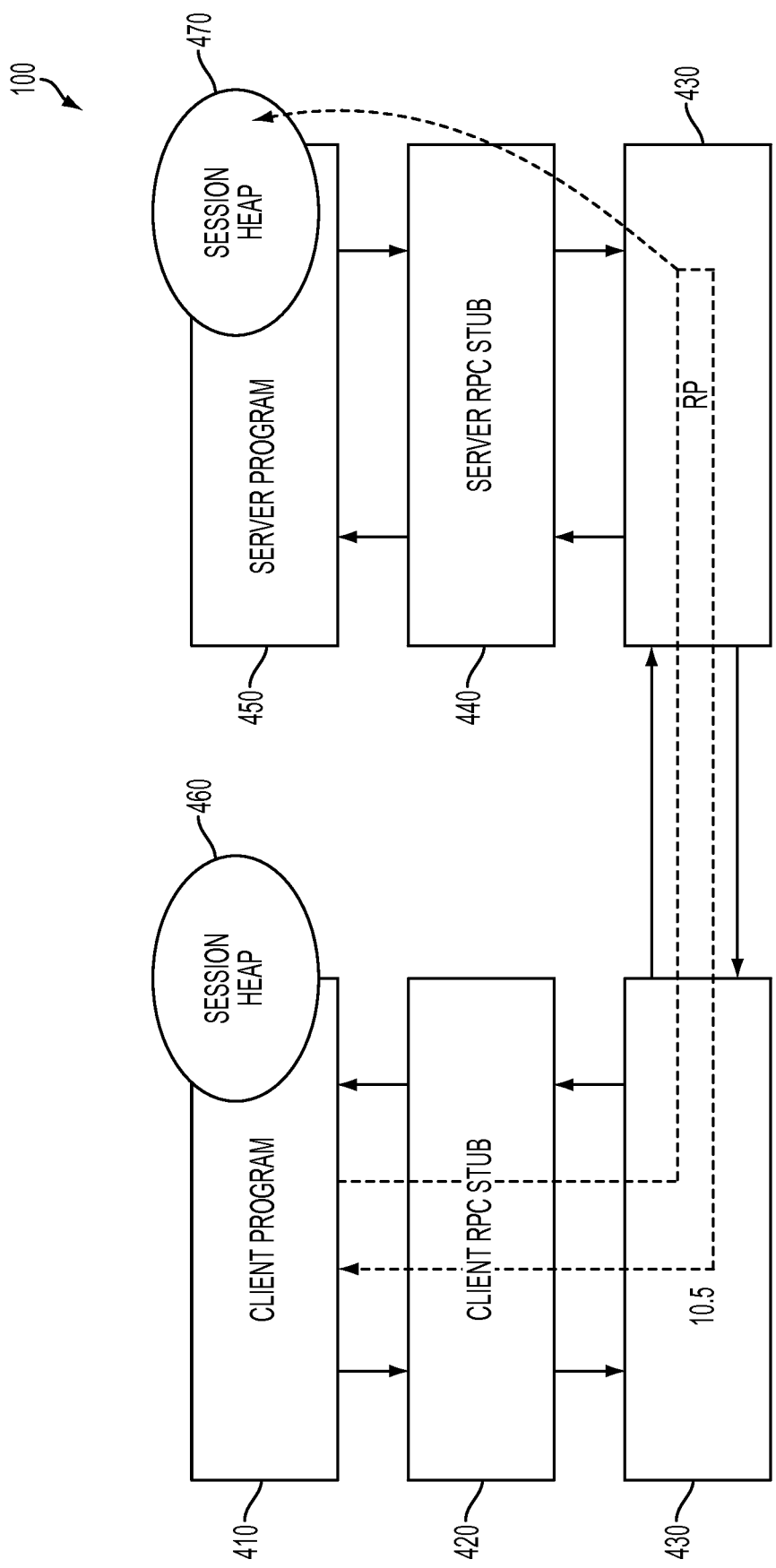
FIG. 10 depicts a block diagram of a RPC operation that returns a result by reference according to an embodiment.

With reference to FIG. 10, a block diagram of a RPC operation 100 that returns a result by reference according to an embodiment is shown. The RPC operation 100 may be performed by an embodiment of the processing device 16 of computer system 10, as discussed above. The RPC operation 100 of an embodiment may include a client program 410, a client RPC stub 420, a RDMA provider 430, a server RPC Stub 440, a server program 450, a client session heap 460, and a server session heap 470.

The client program 410 calls the client RPC stub 420. The client RPC stub 420 marshals the parameters received from the client program 410 and sends the message from the client machine to the server machine via a RDMA provider 430. The server RPC stack 440 unmarshals the received parameters and calls the server program 450. The server program 450 then executes the RPC function, stores the result parameter in the server session heap 470, and passes the result (e.g., object) by reference to the client program 410, via the server RPC stub 440, the RDMA provider 430, and the client RPC stub 420. According to an embodiment, the client program 410 may then access the results field in the server session heap 470 on-demand. This access by the client is made using RDMA read without interrupting the server.

Figure 11:
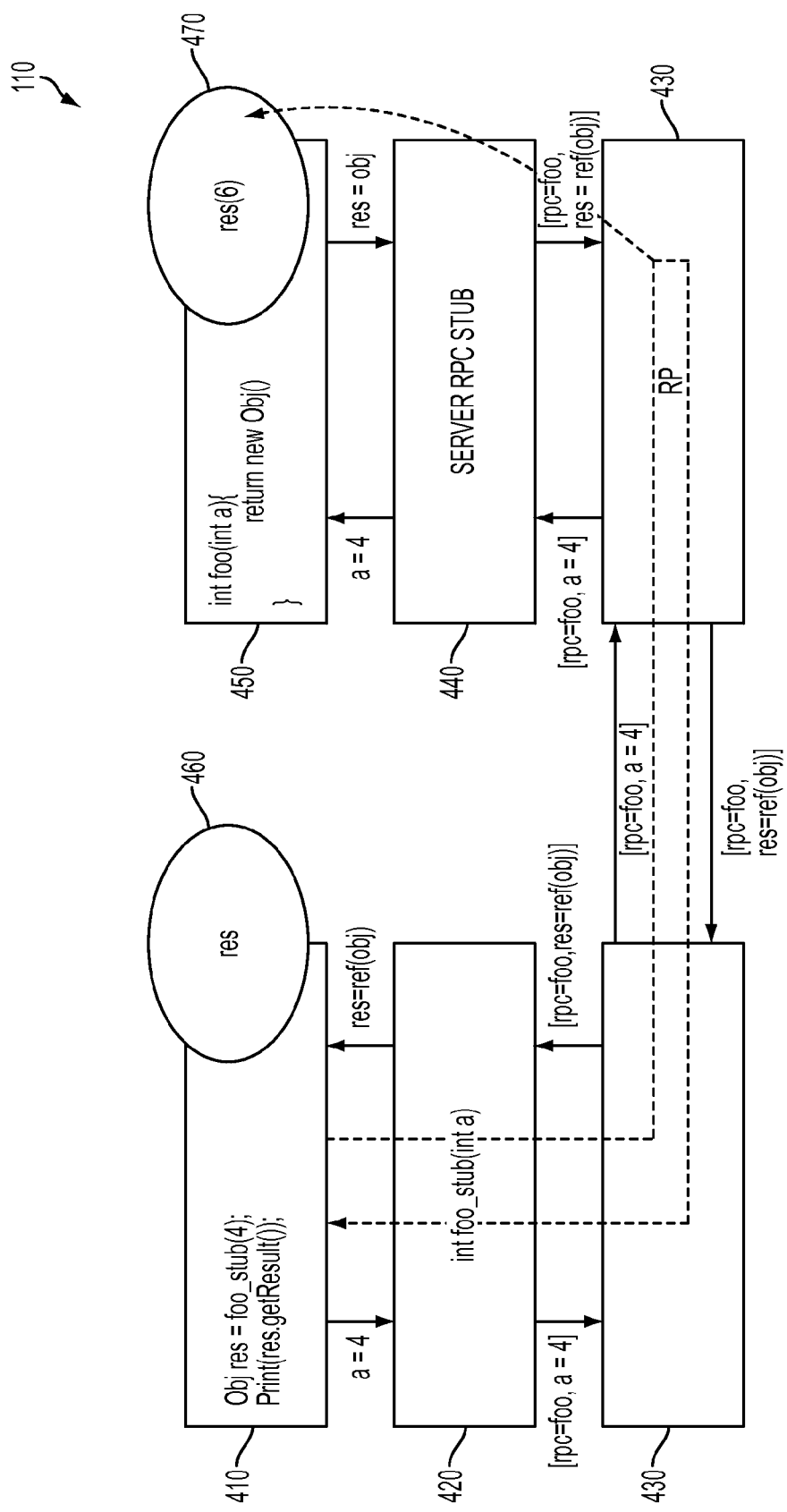
FIG. 11 depicts an example of a RPC operation 110 that returns a result by reference according to an embodiment.

FIG. 11 depicts an example of a RPC operation 110 that returns a result by reference according to an embodiment. As shown in FIG. 11, the client program 410 transfers a parameter value 'a' (a=4) in-place with an RPC request to function 'foo' (rpc=foo) of the server program 450 via the client RPC stub 420, network stack 430, and server RPC stub 440. The server program 450 executes the function 'foo' with the received parameter value 'a', stores the result parameter (e.g., res(6)) in the server session heap 470, and passes the result by reference (e.g., handle res=ref(obj)) to the client program 410, via the server RPC stub 440, the RDMA provider 430, and the client RPC stub 420. According to an embodiment, the client program 410 may then access parts of the RPC results field (e.g., res=6) in the server session heap 470 on-demand (e.g., res.getResult( )) as the result object is de-referenced. This access is done using RDMA read without interrupting the server.

Figure 12:
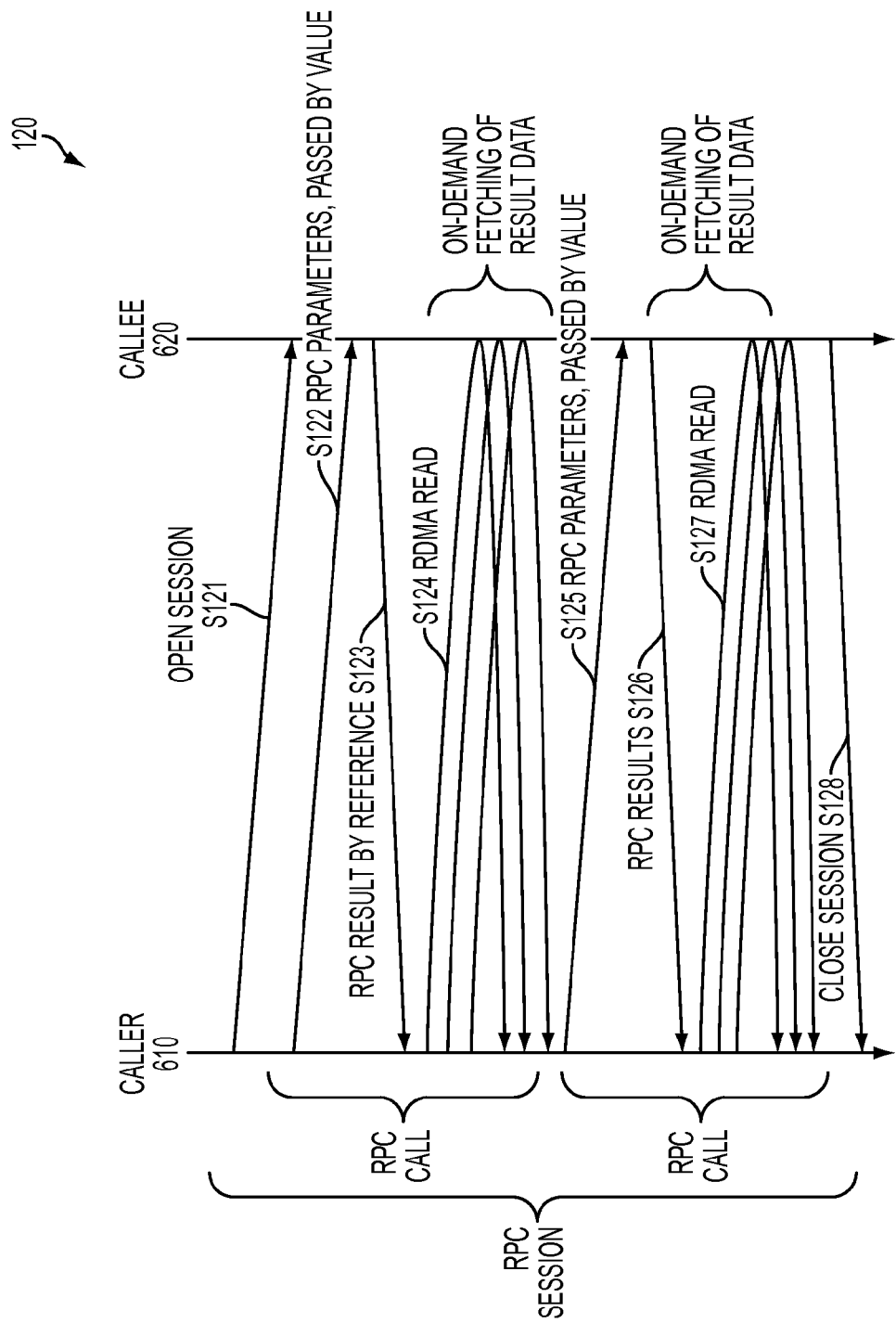
FIG. 12 depicts a message flow for a RPC with a result parameter by reference according to an embodiment.

FIG. 12 depicts a message flow 120 for a RPC with a result parameter by reference according to an embodiment. As shown in FIG. 12, the caller 610 opens a RPC session with a callee 620, as shown in S121. The caller 610 initializes an RPC call by passing RPC parameters by value, as shown in S122. The callee 620 returns the RPC result by reference, as shown in S123. The caller 610 may then access the result parameter on demand via a RDMA read, as shown in S124. The RPC session may continue with a subsequent RPC call (S125-S127) until the callee 620 closes the RPC session, as shown in S128.

Figure 13:
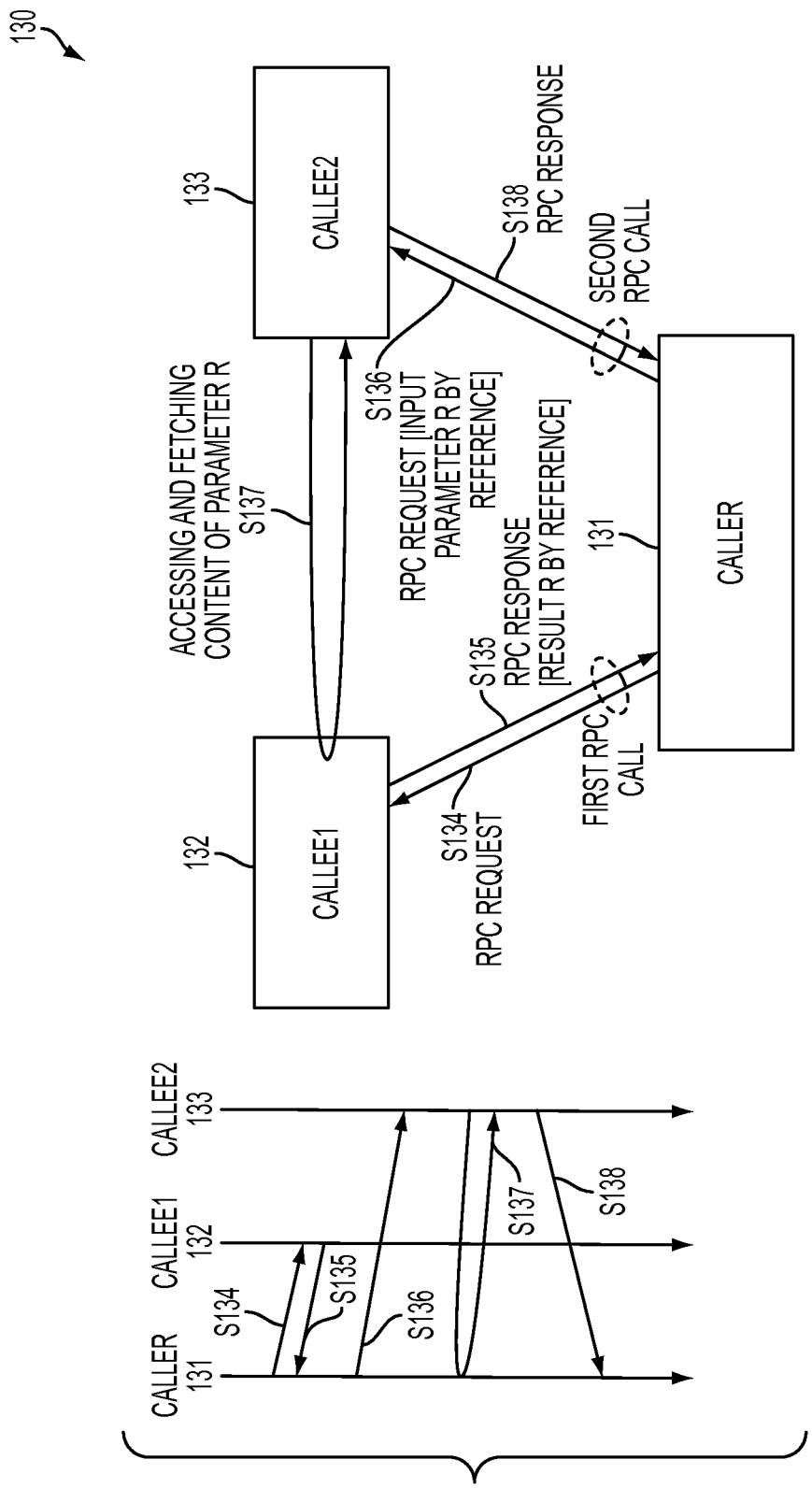
FIG. 13 depicts a block diagram and message flow of a RPC splicing operation according to an embodiment.

With reference to FIG. 13, a block diagram and message flow of a RPC splicing operation 130 according to an embodiment is shown. According to the RPC splicing operation 130, call by reference parameters may uniquely encode a host and memory address of each parameter. This allows building RPC services that operate on parameters residing in session contexts of different physical machines across a data center. Moreover, the RPC splicing operation 130 simplifies chained RPC since parameters do not need to be copied according to an embodiment.

According to a RPC splicing operation 130 of an embodiment, a caller 131 may initiate a first RPC by issuing a RPC request to a first callee 132, as shown in S134. The first callee 131 may respond to the request by returning a RPC result R by reference, as shown in S135. The caller 130 may then initiate a second RPC by issuing a request to a second callee 133 with input parameter R by reference, as shown in S136. The second callee 133 may then access and fetch the content of parameter R from the first callee 131, as shown in S137. The second callee 133 may then responds to the second RPC call, as shown in S138.

Figure 14:
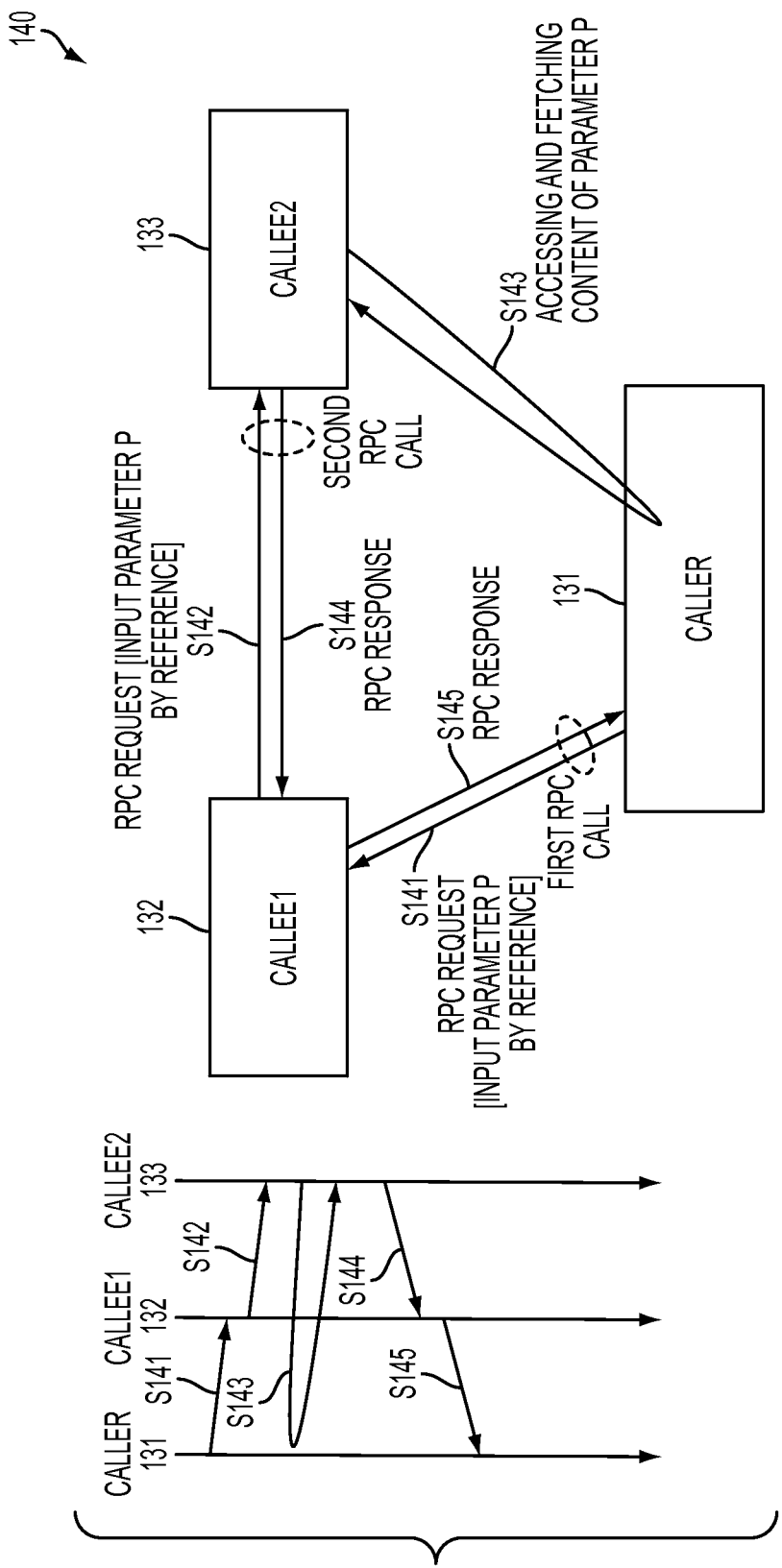
FIG. 14 depicts a block diagram and message flow of a RPC tree operation according to an embodiment.

With reference to FIG. 14, a block diagram and message flow of a RPC tree operation 140 according to an embodiment is shown. The RPC tree operation 140 is a variant of RPC splicing. RPC services may build tree-like structures where the result of one RPC service is based on a series of sub-RPC calls. According to an embodiment, calling by reference allows the passing of parameters along the tree without having to copy the parameter data.

According to the RPC tree operation 140 of an embodiment, the caller 131 may initiate a first RPC by issuing a RPC request to the first callee 132 with input parameter P by reference, as shown in S141. In S142, the first callee 132 may, in turn, issue a RPC request with input parameter P by reference to the second callee 133. The second callee 133 may access and fetch the content of parameter P from the caller 131, as shown in S143, before responding to the first callee 132, as shown in S144. The first callee 132 may then respond to the caller 131, as shown in S145.

According to embodiments disclosed herein, a caller does not need to know which parts of the input parameters are required by a callee's RPC function and a callee does not need to know which parts of the result is required by the caller. Moreover, due to access on-demand according to embodiments, data does not need to be marshaled as in the conventional art. Embodiments potentially save data copies at both the caller and callee. Additionally, embodiments potentially save the serialization/de-serialization of parameters if both the caller and callee operate in the same environment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for a remote procedure call (RPC) with call-by-reference semantics, comprising: a memory having computer readable computer instructions; and a processor for executing the computer readable instructions to perform a method comprising: establishing a session between a client and a server; initializing a session heap memory with a remote direct memory access (RDMA) provider of the client; storing a parameter in the session heap memory of the client, wherein the parameter comprises a value stored at a memory address in the session heap memory; passing a handle for the parameter to the server, wherein the handle comprises a reference to the memory address of the parameter in the session heap memory; and permitting the server to access the value of the parameter stored in the session heap memory of the client responsive to an on-demand request from the server, and further comprising: caching a parameter state within a session; and responsive to a repeating RPC within the session, reading only modified parameters.

2. The computer system of claim 1, wherein the on-demand request comprises a selected one of reading the parameter and writing to the parameter.

3. The computer system of claim 1, wherein the passing of the handle further comprises passing the handle along a cascading chain of RPC requests without having to copy the value of the parameter.

4. The computer system of claim 1, wherein the passing of the handle further comprises passing the handle along a tree-like structure, where a result of one RPC is based on a series of sub-RPC calls, without having to copy the value of the parameter.

* * * * *